US012742063B2

(12) United States Patent
Han et al.

(10) Patent No.: US 12,742,063 B2
(45) Date of Patent: Sep. 22, 2026

(54) THERMOPLASTIC POLYOLEFIN SHEET COMPOSITION HAVING LOW HARDNESS AND LOW ELONGATION, AND THERMOPLASTIC POLYOLEFIN SHEET COMPRISING SAME

(71) Applicants: Hyundai Motor Company, Seoul (KR); Kia Corporation, Seoul (KR); Hanwha Advanced Materials Corporation, Seoul (KR)

(72) Inventors: In Soo Han, Uiwang-si (KR); Jae Hyun An, Seosan-si (KR); Seul Yi, Seoul (KR); Jong Taek Na, Sejong-si (KR); Je Beom Yeon, Cheongju-si (KR)

(73) Assignees: Hyundai Motor Company, and, Seoul (KR); Kia Corporation, and, Seoul (KR); Hanwha Advanced Materials Corporation, Seoul (KR)

( * ) Notice: Subject to any disclaimer, the term of this patent is extended or adjusted under 35 U.S.C. 154(b) by 959 days.

(21) Appl. No.: 18/077,005

(22) Filed: Dec. 7, 2022

(65) Prior Publication Data

US 2024/0010824 A1 Jan. 11, 2024

(30) Foreign Application Priority Data

Jul. 11, 2022 (KR) ........................ 10-2022-0084741

(51) Int. Cl.
*C08L 23/12* (2006.01)
*C08L 23/26* (2006.01)
*C08L 53/02* (2006.01)

(52) U.S. Cl.
CPC ............... *C08L 23/12* (2013.01); *C08L 23/26* (2013.01); *C08L 53/02* (2013.01); *C08L 2205/035* (2013.01)

(58) Field of Classification Search
CPC .......... C08L 23/12; C08L 23/26; C08L 53/02; C08L 2205/035; C08L 23/00; C08L 25/08; C08L 91/00; C08L 2205/02; C08J 5/18; C08J 2323/00; C08J 2353/02; C08J 2423/00; C08J 2423/12; C08J 2453/02; C08K 2003/265; C08K 3/013
See application file for complete search history.

(56) References Cited

U.S. PATENT DOCUMENTS 6,218,474 B1 4/2001 Valligny et al.

FOREIGN PATENT DOCUMENTS

| | | | | |
|---|---|---|---|---|
| CN | 103524979 A | * 1/2014 | | |
| KR | 1019950007662 A | 7/1995 | | |
| KR | 100422937 B1 | 3/2004 | | |
| KR | 1020050097617 A | 10/2005 | | |
| KR | 100876124 B1 | 12/2008 | | |
| KR | 1020110020039 A | 3/2011 | | |
| KR | 101615793 B1 | 4/2016 | | |
| KR | 101615794 B1 | 4/2016 | | |
| KR | 101636600 B1 | 7/2016 | | |
| WO | WO-2022265635 A1 | * 12/2022 | ............ | B29C 55/06 |

OTHER PUBLICATIONS

English Machine Translation of KR100422937 B1 obtained on Dec. 4, 2025 from https://worldwide.espacenet.com/publicationDetails/biblio?DB=EPODOC&II=0&ND=3&adjacent=true&locale=en_EP&FT=D&date=20030527&CC=KR&NR=20030041499A&KC=A (Year: 2003).*
English Machine Translation of KR20110020039 (A)obtained on Dec. 4, 2025 from https://worldwide.espacenet.com/publicationDetails/biblio?II=0&ND=3&adjacent=true&locale=en_EP&FT=D&date=20110302&CC=KR&NR=20110020039A&KC=A (Year: 2011).*
Dwivedi (Global high melt strength polypropylene, 2015 (Year: 2015).*
English Machine Translation of CN103524979 (A) obtained on Dec. 5, 2025 from https://worldwide.espacenet.com/publicationDetails/biblio?CC=CN&NR=103524979A&KC=A&FT=D&ND=3&date=20140122&DB=&locale=en_EP (Year: 2014).*
Technical datasheet of Kraton G1645 V ( Oct. 7, 2019) https://sds.kraton.com/product-sds/shared-files/94418/KratonG1645V.pdf (Year: 2019).*

* cited by examiner

*Primary Examiner* — Joseph S Del Sole
*Assistant Examiner* — Olga Lucia Donahue
(74) *Attorney, Agent, or Firm* — Fish & Richardson P.C.

(57) ABSTRACT

Disclosed are a thermoplastic polyolefin sheet composition, particularly a thermoplastic polyolefin sheet composition having low hardness and low elongation by mixing a cross-linked polyolefin resin, a non-crosslinked polyolefin resin, a polystyrene-based resin, and a high melt polypropylene resin in appropriate amounts, and a thermoplastic polyolefin sheet including the same. The thermoplastic polyolefin sheet composition includes 5 to 60 wt % of a crosslinked polyolefin resin, 5 to 30 wt % of a non-crosslinked polyolefin resin, 15 to 40 wt % of a polystyrene-based resin, and 5 to 10 wt % of a first polypropylene resin.

12 Claims, No Drawings

THERMOPLASTIC POLYOLEFIN SHEET COMPOSITION HAVING LOW HARDNESS AND LOW ELONGATION, AND THERMOPLASTIC POLYOLEFIN SHEET COMPRISING SAME

CROSS-REFERENCE TO RELATED APPLICATION

This application claims priority from Korean Patent Application No. 10-2022-0084741, filed on Jul. 11, 2022, the disclosure of which is incorporated herein by reference in its entirety.

TECHNICAL FIELD

The present disclosure relates to a thermoplastic polyolefin sheet composition.

BACKGROUND

Fuel economy, interior materials, etc. are the top considerations when general consumers choose cars. Recently, for a cockpit module, which occupies the largest proportion among the interior materials, thorough research is ongoing into methods capable of reducing the cost while realizing light weight and improving emotional quality.

SUMMARY

According to the present disclosure, an object of the present disclosure is to provide a thermoplastic polyolefin sheet composition satisfying low elongation, embossing transferability, and surface sensation (low hardness) required for a seat for a cockpit module, and a thermoplastic polyolefin sheet including the same.

The objects of the present disclosure are not limited to the foregoing. The objects of the present disclosure will be able to be clearly understood through the following description and to be realized by the means described in the claims and combinations thereof.

The present disclosure provides a thermoplastic polyolefin sheet composition including 5 to 60 wt % of a crosslinked polyolefin resin, 5 to 30 wt % of a non-crosslinked polyolefin resin, 15 to 40 wt % of a polystyrene-based resin, and 5 to 10 wt % of a first polypropylene resin.

The thermoplastic polyolefin sheet composition may further include 5 to 10 wt % of a second polypropylene resin and 5 to 15 wt % of an inorganic filler.

The crosslinked polyolefin resin may have a specific gravity of 0.88 to 0.93, a hardness (Shore A) of 65 to 75, and an elongation of 300 to 400%.

The crosslinked polyolefin resin may have a crosslinking degree of 50% or more.

The non-crosslinked polyolefin resin may have a specific gravity of 0.88 to 0.90, a hardness (Shore A) of 85 to 95, and an elongation of 600% or more.

The polystyrene-based resin may have a specific gravity of 0.90 to 0.93, a hardness (Shore A) of 35 to 40, and an elongation of 600 to 700%.

The polystyrene-based resin may include 100 parts by weight of poly(styrene-ethylene-butylene-styrene) (SEBS) and 50 to 150 parts by weight of oil.

The first polypropylene resin may have a melt strength (230° C., 3 g/10 min) of 2 to 8 kgf.

The first polypropylene resin may have a hardness (Shore A) of 90 to 95 and an elongation of 0 to 50%.

The second polypropylene resin may have a hardness (Shore A) of 90 to 100 and an elongation of 20% or less.

The thermoplastic polyolefin sheet composition may have a hardness (Shore A) of 70 or less and an elongation of 600% or less.

In addition, the present disclosure provides a thermoplastic polyolefin sheet including the thermoplastic polyolefin sheet composition described above.

DETAILED DESCRIPTION

The above and other objects, features and advantages of the present disclosure will be more clearly understood from the following preferred implementations taken in conjunction with the accompanying drawings. However, the present disclosure is not limited to the implementations disclosed herein, and may be modified into different forms. These implementations are provided to thoroughly explain the disclosure and to sufficiently transfer the spirit of the present disclosure to those skilled in the art.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

The present disclosure pertains to a thermoplastic polyolefin sheet composition having low hardness and low elongation, including 5 to 60 wt % of a crosslinked polyolefin resin, 5 to 30 wt % of a non-crosslinked polyolefin resin, 15 to 40 wt % of a polystyrene-based resin, and 5 to 10 wt % of a first polypropylene resin.

Specifically, the thermoplastic polyolefin sheet composition according to the present disclosure further includes a second polypropylene resin and an inorganic filler. Here, based on the total weight of the composition, 5 to 10 wt % of the second polypropylene resin and 5 to 15 wt % of the inorganic filler may be further included.

Individual components constituting the thermoplastic polyolefin sheet composition according to the present disclosure will be described in more detail as follows.

(A) Crosslinked Polyolefin Resin

The crosslinked polyolefin resin may be included in an amount of 5 to 60 wt % in the thermoplastic polyolefin sheet composition. Here, if the amount of the crosslinked polyolefin resin exceeds 60 wt %, there is no problem in processability, but embossing transferability is deteriorated during in-mold grain vacuum forming, and hardness required for automobile parts becomes unattainable.

The crosslinked polyolefin resin may have a crosslinking degree of 50% or more. Specifically, the crosslinked polyolefin resin may have a specific gravity of 0.88 to 0.93, a hardness (Shore A) of 65 to 75, and an elongation of 300 to 400%.

(B) Non-Crosslinked Polyolefin Resin

The non-crosslinked polyolefin resin may be included in an amount of 5 to 30 wt % in the thermoplastic polyolefin sheet composition. If the amount of the non-crosslinked polyolefin resin is less than 5 wt %, calendaring processability may be deteriorated, whereas if the amount thereof exceeds 30 wt %, quality problems such as bursting and whitening may occur during the molding process.

Specifically, the non-crosslinked polyolefin resin may have a specific gravity of 0.88 to 0.90, a hardness (Shore A) of 85 to 95, and an elongation of 600% or more.

(C) Polystyrene-Based Resin

The polystyrene-based resin may be included in an amount of 15 to 40 wt % in the thermoplastic polyolefin sheet composition. If the amount of the polystyrene-based resin is less than 15 wt %, low hardness (60 to 70 A) required for automobiles cannot be satisfied, whereas if the amount thereof exceeds 40 wt %, processability may be deteriorated due to roll adhesion during calendaring.

The polystyrene-based resin may be configured such that oil is appropriately contained in poly(styrene-ethylene-butylene-styrene) (SEBS) in order to fulfill hardness, specific gravity, and elongation. Specifically, the polystyrene-based resin may include 100 parts by weight of poly(styrene-ethylene-butylene-styrene) and 50 to 150 parts by weight of oil.

Specifically, the polystyrene-based resin may have a specific gravity of 0.90 to 0.93, a hardness (Shore A) of 35 to 40, and an elongation of 600 to 700%.

(D) First Polypropylene Resin

The first polypropylene resin may be included in an amount of 5 to 10 wt % in the thermoplastic polyolefin sheet composition. If the amount of the first polypropylene resin exceeds 10 wt %, calendaring may become difficult, and sagging properties may be decreased during in-mold grain vacuum forming, such that problems such as whitening after molding due to local elongation may occur.

The first polypropylene resin may have high melt strength, particularly melt strength (230° C., 3 g/10 min) of 2 to 8 kgf.

Specifically, the first polypropylene resin may have a hardness (Shore A) of 90 to 95 and an elongation of 0 to 50%.

(E) Second Polypropylene Resin

The second polypropylene resin may be included in an amount of 5 to 10 wt % in the thermoplastic polyolefin sheet composition. Specifically, the second polypropylene resin may have a hardness (Shore A) of 90 to 100 and an elongation of 20% or less.

(F) Inorganic Filler

The inorganic filler may be appropriately added as needed within a range that does not impair the effects of the present disclosure in the thermoplastic polyolefin sheet composition. The inorganic filler may be included in an amount of 5 to 15 wt % in the thermoplastic polyolefin sheet composition.

As the inorganic filler, any known inorganic filler may be used without particular limitation. Specifically, the inorganic filler may be calcium carbonate ($CaCO_3$).

Another aspect of the present disclosure pertains to a thermoplastic polyolefin sheet including the thermoplastic polyolefin sheet composition.

The thermoplastic polyolefin sheet composition according to the present disclosure may exhibit a hardness (Shore A) of 70 or less and an elongation of 600% or less. Here, the hardness (Shore A) and the elongation may be determined by measuring the properties of a thermoplastic polyolefin sheet manufactured through in-mold grain vacuum forming using the thermoplastic polyolefin sheet composition.

Meanwhile, the thermoplastic polyolefin sheet composition according to the present disclosure is not limited as to the field of use thereof, but may be used for a sheet for automobile parts. Specifically, the thermoplastic polyolefin sheet composition according to the present disclosure is very useful for a sheet for automobile parts requiring superior properties such as low elongation, low hardness, and embossing transferability, and processing stability.

A better understanding of the present disclosure may be obtained through the following examples. These examples are merely set forth to illustrate the present disclosure and are not to be construed as limiting the scope of the present disclosure.

EXAMPLES AND COMPARATIVE EXAMPLES

Respective thermoplastic polyolefin sheet compositions were prepared by mixing the components in amounts shown in Table 1 below, followed by kneading using a mill roll at 180° C. for 10 minutes. Thereafter, samples were manufactured through pressing at 190° C.

TABLE 1

| | Example | | | | | Comparative Example | | | | |
|---|---|---|---|---|---|---|---|---|---|---|
| Component (wt %) | 1 | 2 | 3 | 4 | 5 | 1 | 2 | 3 | 4 | 5 |
| Crosslinked polyolefin resin | 60 | 25 | 5 | 30 | 30 | 65 | | 25 | | 55 |
| Non-crosslinked polyolefin resin | 5 | 20 | 20 | 25 | 30 | | 15 | 35 | 20 | 15 |
| Polystyrene-based resin | 15 | 35 | 45 | 30 | 20 | 15 | 45 | 20 | 50 | 10 |
| Second polypropylene resin | 5 | 5 | 10 | | 5 | 5 | 20 | 5 | 10 | 5 |
| First polypropylene resin | 5 | 5 | 10 | 5 | 5 | 5 | 10 | 5 | 10 | 5 |
| Inorganic filler | 10 | 10 | 10 | 10 | 10 | 10 | 10 | 10 | 10 | 10 |
| Total | 100 | 100 | 100 | 100 | 100 | 100 | 100 | 100 | 100 | 100 |

1. Crosslinked polyolefin resin - hardness (Shore A): 75, fully crosslinked polyolefin resin, specific gravity of 0.88-0.93, elongation of 300-400%
2. Non-crosslinked polyolefin resin: specific gravity of 0.88-0.90, hardness (Shore A) of 85-95, elongation of 600% or more
3. Polystyrene-based resin: Poly(styrene-ethylene-butylene-styrene) resin, specific gravity of 0.90-0.93, hardness (Shore A) of 35-40, elongation of 600-700%
4. First polypropylene resin: melt strength of 2-8 kgf at 230° C. and 3 g/10 min, hardness (Shore A) of 90-95, elongation of 0-50%
5. Second polypropylene resin: hardness of (Shore A) of 90-100, elongation of 20% or less
6. Inorganic filler: $CaCO_3$

TEST EXAMPLES

The properties of the samples were evaluated through the following methods, and the results thereof are shown in Table 2 below.

[Evaluation of Properties]

(1) Hardness: Shore A hardness was measured by reading the value of the manufactured sample after 15 seconds in the initial compression state according to the standards specified in ISO 868. Here, tests were performed at least 5 times and the average value thereof was determined.

(2) Elongation: For the manufactured sample, a dumbbell No. 3 sample specified in KS M 6518 was used. Here, the test speed was 200 mm/min, and tests were performed at least 5 times and the average value thereof was determined. Elongation was represented based on the elongation at break.

(3) Transferability: Formability was evaluated by applying the manufactured sample to the corner of the air vent having the weakest embossing transferability during in-mold grain vacuum forming. Here, the embossing transferability was compared with that of the existing TPO product to determine whether it was good or not.

(4) Calendaring processability: In order to evaluate the presence or absence of adhesion during mill roll operation, when the mixture was subjected to rolling for 20 minutes with stirring and then the sample was produced using a two-roll mill, calendaring processability was determined depending on whether there was roll adhesion.

(5) Vacuum Formability: Horizontal and vertical lines were drawn on the surface of the manufactured sample at intervals of 1 cm, and formability was evaluated at least 5 times under the same conditions using a simple molding machine. Here, the elongated section in the molded sample was evaluated, and local elongation and appearance of thickness variation after molding were observed, based on which formability was determined.

TABLE 2

| Evaluation of properties | Unit | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| (1) Hardness | Shore A | 68 | 66 | 62 | 66 | 63 | 67 | 61 | 70 | 57.4 | 71 |
| (2) Elongation | % | 425 | 548 | 573 | 551 | 598 | 395 | 552 | 620 | 605 | 472 |
| (3) Transferability | — | ◎ | ◎ | ◎ | ◎ | ◎ | ◎ | ◎ | ◎ | ○ | ◎ |
| (4) Calendaring processability | — | Good | Good | Good | Good | Good | Good | NG | Good | NG | Good |
| (5) Vacuum Formability | — | Good | Good | Good | Good | Good | NG | — | Good | — | Good |

As is apparent from the results of Table 2, Comparative Example 1, in which the non-crosslinked polyolefin resin was not used, showed poor vacuum formability.

Also, Comparative Example 2, in which the crosslinked polyolefin resin was not used, showed poor calendaring processability.

Also, in Comparative Example 3, in which the non-crosslinked polyolefin resin was used in an amount exceeding 30 wt %, relatively high hardness and elongation were measured compared to Examples.

Also, Comparative Example 4, in which the polystyrene-based resin was used in an amount exceeding 40 wt %, showed poor calendaring processability.

Also, in Comparative Example 5, in which the polystyrene-based resin was used in an amount less than 20 wt %, relatively high hardness was measured compared to Examples.

In contrast, in Examples 1 to 5, using 5 to 60 wt % of the crosslinked polyolefin resin, 5 to 30 wt % of the non-crosslinked polyolefin resin, 15 to 40 wt % of the polystyrene-based resin, 5 to 10 wt % of the first polypropylene resin, 5 to 10 wt % of the second polypropylene resin, and 5 to 15 wt % of the inorganic filler, individual components were mixed in appropriate amounts, indicating that all properties were balanced and high quality was exhibited.

Therefore, the thermoplastic polyolefin sheet composition according to the present disclosure is capable of exhibiting superior embossing transferability as well as low hardness and low elongation by mixing a crosslinked polyolefin resin, a non-crosslinked polyolefin resin, a polystyrene-based resin, and a high melt polypropylene resin in appropriate amounts.

[Evaluation of Airbag Deployment Performance]

A cockpit module product was manufactured through a vacuum forming process, a vibration fusion process, etc. using Example 1, which satisfies the automobile requirements, among Examples. Thereafter, pretreatment operation before testing was performed as shown in Table 3 below, after which airbag deployment performance was verified. The results thereof are shown in Table 4 below.

TABLE 3

| Items | State | Life cycle | Heat aging test |
|---|---|---|---|
| Test procedure | — | −35° C. (6H) → 21° C., 95% (6H) → 71° C. 75% (6H) → 105° C. (6H) = 1 cycle (14 cycles) 1 cycle = temperature, humidity, vibration (only for 1 unit) 14 cycles = temperature, humidity | Leaving at 21° C. for 8 hours after 400 hours at 105° C. |
| Leaving conditions | Within 3 minutes after 4 hours at low temperature: −35° C. (−30), room temperature: 21° C., high temperature: 85° C. | | |

TABLE 4

| Items | Classification | Example 1 |
| --- | --- | --- |
| Airbag deployment performance | State | Normal deployment |
| | Life cycle | Normal deployment |
| | Heat aging test | Normal deployment |

As is apparent from the results of Table 4, normal deployment performance was realized in all of state conditions, life cycle conditions, and heat aging test conditions for evaluation of airbag deployment performance. Accordingly, it can be found that the product satisfying properties (hardness, elongation, transferability, and airbag deployment performance) required for automobiles was manufactured according to the present disclosure.

Therefore, the thermoplastic polyolefin sheet according to the present disclosure is configured such that a polystyrene-based resin is added in an appropriate amount to the existing thermoplastic polyolefin sheet, and can thus be applied to a cockpit module skin material that requires superior properties such as low hardness, low elongation, transferability, and vacuum formability.

In addition, the thermoplastic polyolefin sheet according to the present disclosure is capable of exhibiting increased material quality by improving the soft sensation desired by consumers by virtue of low hardness and low elongation. By changing the existing manual wrapping process to an automated vacuum forming process, labor costs can be effectively reduced, and also, processing costs can be reduced by obviating the need for a laser squaring process, etc.

As is apparent from the above description, a thermoplastic polyolefin sheet composition according to the present disclosure is capable of exhibiting superior embossing transferability as well as low hardness and low elongation by mixing a crosslinked polyolefin resin, a non-crosslinked polyolefin resin, a polystyrene-based resin, and a high melt polypropylene resin in appropriate amounts.

In addition, a thermoplastic polyolefin sheet according to the present disclosure is configured such that a predetermined amount of poly(styrene-ethylene-butylene-styrene) (SEBS) is added to a conventional thermoplastic polyolefin sheet, and can thus be applied to a cockpit module skin material that requires superior properties such as low hardness, low elongation, transferability, and vacuum formability.

The effects of the present disclosure are not limited to the above-mentioned effects. It should be understood that the effects of the present disclosure include all effects that can be inferred from the description of the present disclosure.

Although specific implementations of the present disclosure have been described, those skilled in the art will appreciate that the present disclosure may be embodied in other specific forms without changing the technical spirit or essential features thereof. Thus, the implementations described above should be understood to be non-limiting and illustrative in every way.

What is claimed is:

1. A thermoplastic polyolefin sheet composition, comprising:

an amount of 5 to 60 wt % of a crosslinked polyolefin resin;

an amount of 5 to 30 wt % of a non-crosslinked polyolefin resin;

an amount of 15 to 40 wt % of a polystyrene-based resin; and an amount of 5 to 10 wt % of a first polypropylene resin, wherein the first polypropylene resin has a melt strength of 2 to 8 kgf.

2. The thermoplastic polyolefin sheet composition of claim 1, further comprising:

an amount of 5 to 10 wt % of a second polypropylene resin; and an amount of 5 to 15 wt % of an inorganic filler.

3. The thermoplastic polyolefin sheet composition of claim 2, wherein the second polypropylene resin has a hardness (Shore A) of 90 to 100 measured according to standard of ISO 868, and an elongation of 20% or less measured according to standard specified in KS M 6518.

4. The thermoplastic polyolefin sheet composition of claim 2, wherein the inorganic filler comprises calcium carbonate ($CaCO3$).

5. The thermoplastic polyolefin sheet composition of claim 1, wherein the crosslinked polyolefin resin has a specific gravity of 0.88 to 0.93, a hardness (Shore A) of 65 to 75 measured according to standard of ISO 868, and an elongation of 300 to 400% measured according to standard specified in KS M 6518.

6. The thermoplastic polyolefin sheet composition of claim 1, wherein the crosslinked polyolefin resin has a crosslinking degree of 50% or more.

7. The thermoplastic polyolefin sheet composition of claim 1, wherein the non-crosslinked polyolefin resin has a specific gravity of 0.88 to 0.90, a hardness (Shore A) of 85 to 95 measured according to standard of ISO 868, and an elongation of 600% or more measured according to standard specified in KS M 6518.

8. The thermoplastic polyolefin sheet composition of claim 1, wherein the polystyrene-based resin has a specific gravity of 0.90 to 0.93, a hardness (Shore A) of 35 to 40 measured according to standard of ISO 868, and an elongation of 600 to 700% measured according to standard specified in KS M 6518.

9. The thermoplastic polyolefin sheet composition of claim 1, wherein the polystyrene-based resin comprises 100 parts by weight of poly(styrene-ethylene-butylene-styrene) (SEBS) and 50 to 150 parts by weight of oil.

10. The thermoplastic polyolefin sheet composition of claim 1, wherein the first polypropylene resin has a hardness (Shore A) of 90 to 95 measured according to standard of ISO 868, and an elongation of 0 to 50% measured according to standard specified in KS M 6518.

11. The thermoplastic polyolefin sheet composition of claim 1, wherein the thermoplastic polyolefin sheet composition has a hardness (Shore A) of 70 or less measured according to standard of ISO 868, and an elongation of 600% or less measured according to standard specified in KS M 6518.

12. A thermoplastic polyolefin sheet comprising the thermoplastic polyolefin sheet composition of claim 1.

* * * * *